US012595337B2

(12) United States Patent
Stanjek et al.

(10) Patent No.: US 12,595,337 B2
(45) Date of Patent: Apr. 7, 2026

(54) CROSS-LINKABLE COMPOSITIONS BASED ON ORGANYL OXYSILANE-TERMINATED POLYMERS

(71) Applicant: WACKER CHEMIE AG, Munich (DE)

(72) Inventors: Volker Stanjek, Ampfing (DE); Andreas Bauer, Kirchdorf (DE); Lars Zander, Altoetting (DE)

(73) Assignee: Wacker Chemie AG, Munich (DE)

( * ) Notice: Subject to any disclaimer, the term of this patent is extended or adjusted under 35 U.S.C. 154(b) by 976 days.

(21) Appl. No.: 17/782,811

(22) PCT Filed: Dec. 6, 2019

(86) PCT No.: PCT/EP2019/084076
§ 371 (c)(1),
(2) Date: Jun. 6, 2022

(87) PCT Pub. No.: WO2021/110281
PCT Pub. Date: Jun. 10, 2021

(65) Prior Publication Data
US 2023/0357502 A1 Nov. 9, 2023

(51) Int. Cl.
*C08G 65/336* (2006.01)
*B32B 7/14* (2006.01)
*B32B 37/12* (2006.01)
*C09J 5/00* (2006.01)
*C09J 171/02* (2006.01)
*C09K 3/10* (2006.01)

(52) U.S. Cl.
CPC .............. *C08G 65/336* (2013.01); *B32B 7/14* (2013.01); *B32B 37/12* (2013.01); *C09J 5/00* (2013.01); *C09J 171/02* (2013.01); *C09K 3/1018* (2013.01)

(58) Field of Classification Search
CPC ......... C08G 65/336; B32B 7/14; B32B 37/12; C09J 5/00; C09J 171/02; C09K 3/1018
See application file for complete search history.

(56) References Cited

U.S. PATENT DOCUMENTS

| | | | |
|---|---|---|---|
| 6,884,852 B1 | 4/2005 | Klauck et al. | |
| 7,091,298 B2 | 8/2006 | Schindler et al. | |
| 7,319,128 B2 | 1/2008 | Ziche et al. | |
| 8,101,704 B2 | 1/2012 | Baumann et al. | |
| 9,340,714 B2 | 5/2016 | Stanjek et al. | |
| 10,030,183 B2 | 7/2018 | Stanjek et al. | |
| 2012/0059130 A1 | 3/2012 | Neuhausen et al. | |
| 2017/0044410 A1* | 2/2017 | Stanjek | .................. B05D 3/108 |
| 2017/0198101 A1* | 7/2017 | Stanjek | .................... C08K 9/10 |

FOREIGN PATENT DOCUMENTS

| | | | |
|---|---|---|---|
| DE | 102014210309 A1 | 12/2015 | |
| EP | 1093482 B1 | 8/2004 | |
| EP | 0931800 B1 | 10/2004 | |
| EP | 1414909 B1 | 10/2004 | |
| EP | 1535940 B1 | 6/2007 | |
| EP | 1896523 B1 | 10/2010 | |
| EP | 2222751 B1 | 7/2011 | |
| EP | 2785755 B1 | 1/2017 | |
| WO | 2015158624 A1 | 10/2015 | |

* cited by examiner

*Primary Examiner* — Kumar R Bhushan
(74) *Attorney, Agent, or Firm* — BROOKS KUSHMAN P.C.

(57) ABSTRACT

Alkoxysilyl-terminated polymers having from 5-60% of α-silyl groups and also having non-α-silyl groups can be stabilized by conventional water scavengers to produce rapid-curing room temperature vulcanizable one component silicone composition which are storage stable.

12 Claims, No Drawings

1

CROSS-LINKABLE COMPOSITIONS BASED ON ORGANYL OXYSILANE-TERMINATED POLYMERS

CROSS REFERENCE TO RELATED APPLICATIONS

This application is the U.S. National Phase of PCT Appln. No. PCT/EP2019/084076 filed Dec. 6, 2019, the disclosure of which is incorporated in its entirety by reference herein.

BACKGROUND OF THE INVENTION

1. Field of the Invention

The invention relates to crosslinkable compositions of silane-crosslinking polymers, to methods for producing them and to their use as adhesives and sealants.

2. Description of the Related Art

Polymer systems possessing reactive alkoxysilyl groups are well-established. On contact with water or atmospheric moisture, these alkoxysilane-terminated polymers are able to condense with each other even at room temperature, with elimination of the alkoxy groups. One of the most important applications of such materials is the production of adhesives, especially of elastic adhesive systems, and of sealants.

Adhesives based on alkoxysilane-crosslinking polymers exhibit very good mechanical properties in the fully cured state, being able to have both tensile strength and high elasticity. A further decisive advantage of silane-crosslinking systems over numerous other adhesive and sealant technologies (over isocyanate-crosslinking systems, for example) is the toxicological harmlessness of the prepolymers.

In many applications in this realm there is a preference for one-component systems (1K systems) which cure on contact with atmospheric moisture. Foremost among the decisive advantages of one-component systems is their very easy applicability, since in this case there is no need for the user to mix different adhesive components. As well as the time and work saved and the reliable avoidance of possible metering errors, with one-component systems there is also no need to process the adhesive/sealant within a usually quite narrow time window, as is the case for multicomponent systems after the two components have been thoroughly mixed.

A disadvantage affecting the majority of alkoxysilane-crosslinking systems in accordance with the prior art, however, is the low moisture reactivity of the corresponding polymers, which necessitates aggressive catalysis. The corresponding mixtures therefore typically include considerable quantities of toxicologically objectionable tin catalysts.

An advantage here is the use of what are called α-silane-terminated polymers, possessing reactive alkoxysilyl groups connected by a methylene spacer, referred to as an α spacer, to an adjacent urethane unit. This class of compound is substantially more reactive than the conventional γ-silane-terminated polymers, in which the alkoxysilyl groups are connected via a propylene spacer, referred to as a γ spacer, to an adjacent heteroatom. The α-silane-terminated polymers generally require neither tin catalysts nor strong acids or bases in order to achieve high curing rates on air contact. Commercially available α-silane-terminated polymers are GENIOSIL® STP-E10 or GENIOSIL® STP-E30 from Wacker-Chemie A G, Munich, DE.

A limitation of this so-called a technology, however, lies in the fact that the commercially available α-silane-functional polymers, including the above-mentioned Wacker products, are terminated with dimethoxy-methylsilyl groups, and there are no products with trimethoxysilyl end groups available.

For the majority of end products in the adhesive and sealant market, the existing α-silane-terminated polymers are outstandingly suitable and in many cases, indeed, superior to comparable conventional di- or trimethoxysilyl-functional products. There are, however, also applications for which polymers having α-trimethoxysilane end groups would be desirable.

Such applications include the following examples:

Extremely rapid adhesives, known as "instant adhesives", since α-trimethoxysilyl groups are again more reactive than the corresponding α-dimethoxymethylsilyl end groups.

Wood flooring adhesives free from tin catalyst, which possess a long open time but thereafter develop hardness very rapidly indeed. In these systems, polymers terminated exclusively with α-dimethoxysilyl groups, which on curing form a network with comparatively low crosslinking density, are inferior to corresponding α-trimethoxysilyl systems.

Tin-free sealants of high or low modulus which at the same time exhibit good resilience. Here again, the latter property is more easily achievable with trimethoxysilyl-functional polymers than with comparable dimethoxysilyl-terminated products.

Silane-terminated polymers having α-trimethoxysilyl end groups have in principle been known for a long time and have been described more than once in the past, including in EP-A 1 414 909. Disadvantageous aspects, however, are that because of their extremely high reactivity, such polymers are almost impossible to work with and, moreover, they cannot be stabilized with conventional water scavengers such as vinyltrimethoxysilane, for example.

Such conventional scavengers are used in virtually all adhesive and sealant formulations with practical relevance that are based on silane-terminated polymers, since it is almost impossible to prevent the ingress of relatively small quantities of water, particularly in the form of the water absorbed on the surfaces of the fillers that are used. Moreover, no container, neither tube nor cartridge, is perfectly watertight, and so water scavengers are vital even in filler-free systems.

Water scavengers such as vinyltrimethoxysilane intercept these traces of water by reacting with them and so entirely or at least largely prevent the premature condensation of the silane-terminated polymers and the associated increase in viscosity.

But if, as in the case of α-trimethoxysilane-terminated polymers, the crosslinkable polymer is significantly more reactive toward the aforementioned water traces than is the water scavenger, the latter is no longer able to fulfil its function. A consequence of this is that adhesives and sealants based on these extremely highly reactive polymers require water scavengers that are likewise highly reactive.

One solution here—as described in EP-A 1 414 909—may be the use of highly reactive α-silanes, which just like the polymer possess alkoxysilyl groups separated only by a methylene spacer from an adjacent heteroatom. A disadvantage of this solution, however, is that these α-silanes are very expensive, which makes their use in the price-sensitive adhesives and sealants market virtually impossible from an economic standpoint.

One conceivable possibility for solving these problems of adhesives and sealants based exclusively on polymers terminated with α-trimethoxysilyl groups would be the use of "mixed systems", in which the polymers are functionalized partly with α-trimethoxysilyl groups and partly with conventional, less-reactive trimethoxysilyl groups. An approach of this kind is described in EP-A 2 222 751. And yet EP-A 2 222 751 specifically describes only systems which, based on the amount of alkoxysilane-terminated polymers, include more than 2% of N-trimethoxysilylmethyl-O-methylcarbamate, i.e., one of the aforementioned expensive α-silanes. The aforementioned problem that the use of these α-silanes is almost impossible from an economic standpoint has therefore been solved neither by EP 2 222 751 nor in the subsequent decade.

The object was therefore that of finding a composition which is based on polymers terminated with trimethoxysilane groups but which no longer has the above-stated disadvantages of the prior art.

SUMMARY OF THE INVENTION

One of the objects of the invention, then, is direct to crosslinkable compositions (Z) comprising (A) 100 parts by weight of compounds of the formula $$Y—[(CR^1_2)_a—Si(OR)_3]_x \qquad (I),$$

where

Y is an x-valent polymer radical bonded via nitrogen or oxygen,

R may be identical or different and is hydrogen or a monovalent, optionally substituted hydrocarbon radical, $R^1$ may be identical or different and is hydrogen or a monovalent, optionally substituted hydrocarbon radical which may be attached via nitrogen, phosphorus, oxygen, sulfur or carbonyl group to the carbon atom, x is an integer from 2 to 10, preferably 2 or 3, more preferably 2, and a is an integer from 1 to 10, preferably 1, 3 or 4, more preferably 1 or 3, with the proviso that in component (A) in 5% to 60% of all the units $[(CR^1_2)_a—Si(OR)_3]$ a is 1 and in at least 5% of all the compounds of the formula (I) per molecule at least one a is 1 and at least one a is an integer from 2 to 10, (B) at least 0.1 part by weight of silanes selected from tetraethoxysilane and silanes of the formula $$R^4—Si(CH_3)_b(OR^2)_{3-b} \qquad (II),$$

where $R^2$ may be identical or different and is hydrogen or a monovalent, optionally substituted hydrocarbon radical, $R^4$ is a monovalent, optionally substituted hydrocarbon radical which may be interrupted by oxygen atoms and which contains no nitrogen atom not bonded directly to a carbonyl group, and no heteroatom separated only by a single carbon atom from the silicon atom, and b is 0 or 1, preferably 0, and also (C) at most 2 parts by weight of one or more silanes of the formula $$X—CH_2—SiR^6_c(OR^5)_{3-c} \qquad (III),$$

where $R^5$ may be identical or different and is hydrogen or a monovalent, optionally substituted hydrocarbon radical,

$R^6$ may be identical or different and is a monovalent, optionally substituted hydrocarbon radical, X is a group of the formula $—NR^7_2$, $—NR^7—CO—R^8$, $—NR^7—CO—OR^8$, $—NR^7—CO—NR^8_2$, $—OR^7$, $—O—CO—R^7$, $O—CO—OR^7$, $O—CO—NR^7_2$ or a heterocycle bonded via N atom, $R^7$ may be identical or different and is hydrogen or a monovalent, optionally substituted hydrocarbon radical having 1 to 6 carbon atoms, $R^8$ may be identical or different and is hydrogen or a monovalent, optionally substituted hydrocarbon radical having 1 to 6 carbon atoms and c is 0 or 1.

The heteroatoms in the context of the invention are atoms which are not carbon or hydrogen.

DETAILED DESCRIPTION OF THE PREFERRED EMBODIMENTS

The invention is based on the surprising revelation that polymers (A) which possess not only highly reactive α-trimethoxysilyl groups but also conventional trimethoxysilyl groups, i.e., trimethoxysilyl groups of the formula (1) where a is other than 1, in the proportions according to the invention, can also be stabilized with conventional water scavengers such as with vinyltrimethoxysilane and do not require any highly reactive α-silane water scavengers. This finding is all the more surprising in that only polymers (A) which contain a certain fraction of polymers which within one molecule contain both α- and conventional trimethoxysilyl groups can be stabilized with conventional water scavengers, but not polymer mixtures composed of polymers containing exclusively highly reactive α-trimethoxysilyl groups and polymers whose chain ends are terminated exclusively with conventional trimethoxysilyl groups.

Examples of radicals R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical, isooctyl radicals and the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl, cycloheptyl radical and methylcyclohexyl radicals; alkenyl radicals, such as the vinyl, 1-propenyl and the 2-propenyl radical; aryl radicals, such as the phenyl, naphthyl, anthryl and phenanthryl radical; alkaryl radicals, such as o-, m-, p-tolyl radicals; xylyl radicals and ethylphenyl radicals; and aralkyl radicals, such as the benzyl radical, the α- and the β-phenylethyl radical.

Examples of substituted radicals R are haloalkyl radicals, such as the 3,3,3-trifluoro-n-propyl radical, the 2,2,2',2', 2'-hexafluoroisopropyl radical and the heptafluoroisopropyl radical, and also haloaryl radicals, such as the o-, m- and p-chlorophenyl radical.

Radical R preferably comprises monovalent hydrocarbon radicals having 1 to 6 carbon atoms, more preferably alkyl radicals having 1 or 2 carbon atoms, and more particularly the methyl radical.

Examples of radicals $R^1$ are hydrogen, the radicals indicated for R, and also optionally substituted hydrocarbon radicals bonded via nitrogen, phosphorus, oxygen, sulfur, carbon or carbonyl group to the carbon atom.

Radical $R^1$ preferably comprises hydrogen or hydrocarbon radicals having 1 to 20 carbon atoms, and more particularly comprises hydrogen.

Preferably the value of a in 10% to 45%, more preferably in 15% to 40%, of all the units $[(CR^1_2)_a—Si(OR)_3]$ in component (A) is 1, with R and $R^1$ having the definitions indicated for them above.

Preferably in component (A), at least 10%, more preferably at least 15%, of all the compounds of the formula (I) possess per molecule at least one group $[(CR^1_2)—Si(OR)_3]$ and at least one group $[(CR^1_2)_a—Si(OR)_3]$ in which a is an integer from 2 to 10, more preferably 3 or 4, most preferably 3, with R and $R^1$ having in each case the definitions indicated for them above.

Polymers on which the polymer radical Y is based comprehend, for the purposes of the present invention, all polymers wherein at least 50%, preferably at least 70%, more preferably at least 90% of all the bonds in the main chain are carbon-carbon, carbon-nitrogen or carbon-oxygen bonds.

Examples of polymer radicals Y are polyester, polyether, polyurethane, polyalkylene and polyacrylate radicals.

Polymer radical Y preferably comprises organic polymer radicals which as a polymer chain comprise polyoxyalkylenes, such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers, such as polyisobutylene and copolymers of polyisobutylene with isoprene; polychloroprenes; polyisoprenes; polyurethanes; polyesters; polyamides; polyacrylates; polymethacrylates; vinyl polymer and polycarbonates, and which are preferably bonded via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR'— to the group or groups $—[(CR^1_2)_a—Si(OR)_3]$, where R' may be identical or different and has a definition indicated for R or is a group —CH(COOR'')—CH_2—COOR'' in which R'' may be identical or different and has a definition indicated for R.

Radical R' is preferably a group —CH(COOR'')—CH_2—COOR'' or an optionally substituted hydrocarbon radical having 1 to 20 carbon atoms, more preferably a linear, branched or cyclic alkyl group having 1 to 20 carbon atoms, or an aryl group having 6 to 20 carbon atoms which is optionally substituted by halogen atoms.

Examples of radicals R' are cyclohexyl, cyclopentyl, n- and isopropyl, n-, iso- and t-butyl, the various stereoisomers of the pentyl radical, hexyl radical or heptyl radical, and the phenyl radical.

The radicals R'' are preferably alkyl groups having 1 to 10 carbon atoms, more preferably methyl, ethyl or propyl radicals.

The component (A) may have the groups $—[(CR^1_2)_a—Si(OR)_3]$, attached in the manner described, at any desired locations in the polymer, such as, for instance, in chain positions and/or terminally.

Radical Y preferably comprises polyurethane radicals or polyoxyalkylene radicals, more preferably catenary polyurethane radicals or catenary polyoxyalkylene radicals having in each case 0 to 3 branching points with terminally attached groups $—[(CR^1_2)_a—Si(OR)_3]$, where branching points for the purposes of the invention comprehend all branches from the main chain having more than one carbon atom, and the radicals and indices have the definitions stated above.

More particularly radical Y in formula (I) comprises catenary polyurethane radicals or catenary polyoxyalkylene radicals without branching points, with terminally attached groups $—[(CR^1_2)_a—Si(OR)_3]$, where the radicals and indices have the definitions stated above.

The polyurethane radicals Y are preferably those whose chain ends are bonded via —NH—C(=O)O—, —NH—C(=O)—NH—, —NR'—C(=O)—NH— or —NH—C(=O)—NR'—, more particularly via —O—C(=O)—NH— or —NH—C(=O)—NR'—, to the group or groups $—[(CR^1_2)_a—Si(OR)_3]$, with all of the radicals and indices having one of the definitions stated above. The polyurethane radicals Y here are preferably prepared from linear or branched polyoxyalkylenes, more particularly from polypropylene glycols, and di- or polyisocyanates.

The polyoxyalkylene radicals Y are preferably linear or branched polyoxyalkylene radicals, more preferably polyoxypropylene radicals, most preferably linear polyoxypropylene radicals, whose chain ends are bonded preferably via —O—C(=O)—NH— to the group or groups $—[(CR^1_2)_a—Si(OR)_3]$, with the radicals and indices having one of the definitions stated above. Preferably here at least 85%, more preferably at least 90%, more particularly at least 95% of all the chain ends are bonded via —O—C(=O)—NH— to the group $—[(CR^1_2)_a—Si(OR)_3]$.

The end groups of the compounds (A) used in the invention are preferably groups of the general formulae $$—NH—C(=O)—NR'—(CR^1_2)_a—Si(OR)_3 \qquad (Ia),$$

or $$—O—C(=O)—NH—(CR^1_2)_a—Si(OR)_3 \qquad (Ib),$$

where all radicals and indices have one of the definitions indicated for them above.

Where the compounds (A) are polyurethanes, as is preferred, they preferably have end groups with propylene spacer of the formula $$—NH—C(=O)—NR'—(CH_2)_3—Si(OCH_3)_3,$$

$$—NH—C(=O)—NR'—(CH_2)_3—Si(OC_2H_5)_3,$$

$$—O—C(=O)—NH—(CH_2)_3—Si(OCH_3)_3 \text{ or}$$

$$—O—C(=O)—NH—(CH_2)_3—Si(OC_2H_5)_3$$

in combination with end groups with methylene spacer of the formula $$—NH—C(=O)—NR'—CH_2—Si(OCH_3)_3,$$

$$—NH—C(=O)—NR'—CH_2—Si(OC_2H_5)_3,$$

$$—O—C(=O)—NH—CH_2—Si(OCH_3)_3 \text{ or}$$

$$—O—C(=O)—NH—CH_2—Si(OC_2H_5)_3,$$

where R' has the definition stated above, with the proviso that in component (A) 5% to 60% of all the end groups are end groups with methylene spacer and at least 5% of all the compounds (A) have per molecule at least one end group with methylene spacer and at least one end group with propylene spacer.

Where the compounds (A) are polyalkylene glycols, more particularly polypropylene glycols, which is particularly preferred, they preferably have end groups with propylene spacers of the formulae $$-O-C(=O)-NH-(CH_2)_3-Si(OC_2H_5)_3 \text{ or}$$

$$-O-C(=O)-NH-(CH_2)_3-Si(OCH_3)_3$$

in combination with end groups with methylene spacers of the formulae $$-O-C(=O)-NH-CH_2-Si(OCH_3)_3 \text{ or}$$

$$-O-C(=O)-NH-CH_2-Si(OC_2H_5)_3,$$

where the combination of the end groups $$-O-C(=O)-NH-(CH_2)_3-Si(OCH_3)_3 \text{ and}$$

$$-O-C(=O)-NH-CH_2-Si(OCH_3)_3$$

is particularly preferred,
with the proviso that in component (A) 5% to 60% of all the end groups are end groups with methylene spacer and at least 5% of all the compounds (A) have per molecule at least one end group with methylene spacer and at least one end group with propylene spacer.

The average molecular weights $M_n$ of the compounds (A) are preferably at least 400 g/mol, more preferably at least 4000 g/mol, more particularly at least 10,000 g/mol, and preferably at most 30,000 g/mol, more preferably at most 25,000 g/mol, more particularly at most 19,000 g/mol.

In the context of the present invention the number-average molar mass $M_n$ here is determined by size exclusion chromatography (SEC) against polystyrene standard, in THF, at 60° C., flow rate 1.2 ml/min and detection with RI (refractive index detector) on a Styragel HR3-HR4-HR5-HR5 column set from Waters Corp. USA with an injection volume of 100 μl.

The viscosity of the compounds (A) is preferably at least 0.2 Pas, more preferably at least 1 Pas, yet more preferably at least 5 Pas, and preferably at most 700 Pas, more preferably at most 100 Pas, measured in each case at 20° C.

The viscosity of non-pasty liquids is determined in the context of the present invention after conditioning at 23° C. with a DV 3 P rotational viscometer from A. Paar (Brookfield systems) using spindle 6 at 5 Hz in accordance with ISO 2555.

The compounds (A) used in the invention may be prepared by known processes, in particular by reactions between isocyanate-functional compounds with compounds which have isocyanate-reactive groups.

Where the compounds (A) are silane-terminated polyurethanes, which is preferred, there are two candidate preparation processes which are preferred in each case.

The first preferred process provides for a reaction of isocyanate-functional polyurethane prepolymers with a combination of at least two amino silanes, of which at least one is of the formula (IV) and at least one is of the formula (V)

$$HNR'-(CR^1_2)_a-Si(OR)_3 \qquad (IV)$$

$$HNR'-CR^1_2-Si(OR)_3 \qquad (V),$$

where all the variables have one of the definitions stated above.

The components (IV) and (V) here are used in a proportion such as to give a component (A) used in the invention, i.e., a component (A) which meets the conditions stated in claim 1 for the variable a.

The isocyanate-functional polyurethane prepolymer here may either be reacted with a mixture of the silanes (IV) and (V), or successively be reacted first with one of these two silanes, with the last being used in a deficit amount, and the remaining isocyanate groups then being reacted with the respective second silane.

Processes relating to the in-principle procedure for preparing a component (A) of this kind are described in publications including EP 1 093 482 B1 (paragraphs [0014]-[0023], [0039]-[0055] and also inventive example 1 and comparative example 1) or EP 2 785 755 B1 (paragraphs [0052]-[0080] and also examples 1, 2, 7 and 8), which are considered part of the disclosure content of the present application. However, the processes described therein must be modified such that the silane termination of the isocyanate-functional polyurethane prepolymers is carried out using not pure silanes but instead the above-stated mixtures of the silanes (IV) and (V).

The second preferred process for preparing a silane-terminated polyurethane (A) used in the invention provides for a reaction of hydroxy-functional polyurethane prepolymers with a combination of at least two isocyanate-functional silanes, of which at least one is of the formula (VI) and at least one is of the formula (VII)

$$OCN-(CR^1_2)_a-Si(OR)_3 \qquad (VI)$$

$$OCN-CR^1_2-Si(OR)_3 \qquad (VII),$$

where all the variables have one of the definitions stated above.

The components (VI) and (VII) here are used in a proportion such as to give a component (A) used in the invention, i.e., a component (A) which meets the conditions stated in claim 1 for the variable a.

The hydroxy-functional polyurethane prepolymer here may either be reacted with a mixture of the silanes (VI) and (VII), or successively be reacted first with one of these two silanes, with the last being used in a deficit amount, and the remaining hydroxyl groups then being reacted with the respective second silane.

Suitable processes for preparing a corresponding component (A) are described in publications including EP 0 931 800 A (paragraphs [0011]-[0022] and also examples 1-5), which are considered part of the disclosure content of the present application. However, the processes described therein must be modified such that the silane termination of the hydroxy-functional polyurethane prepolymers is carried out using not pure silanes but instead the above-stated mixtures of the silanes (VI) and (VII).

Where the compounds (A) are silane-terminated polypropylene glycols, which is particularly preferred, they are prepared preferably by a reaction of hydroxy-functional polypropylene glycols with a combination of at least two isocyanate-functional silanes, of which at least one is of the above-stated formula (VI) and at least one is of the formula (VII).

The components (VI) and (VII) here are used in a proportion such as to give a component (A) used in the invention, i.e., a component (A) which meets the conditions stated in claim 1 for the variable a.

In this case the hydroxy-functional polypropylene glycol may either be reacted with a mixture of the silanes (VI) and (VII), or successively be reacted first with one of these two silanes, with the last being used in a deficit amount, and the remaining hydroxyl groups then being reacted with the respective second silane.

Suitable processes for preparing a corresponding component (A) are described in publications including EP 1 535 940 B1 (paragraphs [0005]-[0025] and also inventive examples 1-3 and comparative examples 1-4) or EP 1 896 523 B1 (paragraphs [0008]-[0047]), which are considered part of the disclosure content of the present application. However, the processes described therein must be modified such that the silane termination of the polypropylene glycols is carried out using not pure isocyanato-functional silanes but instead the above-stated mixtures of the silanes (VI) and (VII).

The moisture-curing compositions (Z) of the invention preferably comprise compounds (A) in concentrations of at least 8 wt %, more preferably at least 15 wt %. The crosslinkable compositions (Z) of the invention preferably comprise compounds (A) in concentrations of at most 98 wt %, more preferably at most 95 wt %, where the compositions (Z) contain no fillers, and at most 50%, more preferably at most 40 wt %, when they do contain fillers.

Examples of radical $R^2$ are the examples indicated for radical R.

Radical $R^2$ preferably comprises monovalent hydrocarbon radicals having 1 to 6 carbon atoms, more preferably alkyl radicals having 1 or 2 carbon atoms, and more particularly comprises the methyl radical.

Examples of radical $R^4$ are the examples indicated for radical R, and also O-alkylcarbamatoalkyl-functional radicals such as the O-methylcarbamatopropyl or the O-ethyl-carbamatopropyl radical, epoxy-functional radicals such as the glycidyloxypropyl radical, urea-functional radicals such as the ureapropyl radical, acryloyl- or methacryloyl-functional radicals such as the 3-methacryloyloxypropyl or the 3-acryloyloxypropyl radical.

Radical $R^4$ preferably comprises alkyl radicals having 1 to 8 carbon atoms, alkenyl radicals having 1 to 8 carbon atoms, or aromatic radicals having 1 to 10 carbon atoms, with particular preference being given to the methyl, ethyl, propyl, vinyl or the phenyl radical, more particularly to the vinyl or the phenyl radical.

Examples of component (B) are tetraethoxysilane, vinyl-silanes such as vinyltrimethoxysilane, vinyltriethoxysilane or vinylmethyldimethoxysilane, arylsilanes such as phenyltrimethoxysilane, phenyltriethoxysilane or phenylmethyldimethoxysilane, alkylsilanes such as methyltrimethoxysilane, dimethyldiethoxysilane, dimethyldimethoxysilane, ethyltrimethoxysilane, ethyltriethoxysilane, propyltrimethoxysilane, propyltriethoxysilane, propylmethyldimethoxysilane, n-octyltrimethoxysilane, n-octyltriethoxysilane, i-octyltrimethoxysilane or i-octyltriethoxysilane, carbamatosilanes such as N-(3-trimethoxysilylpropyl)-O-methylcarbamate or N-(3-triethoxysilylpropyl)-O-ethylcarbamate, epoxysilanes such as glycidyloxypropyltrimethoxysilanes, glycidyloxypropyl-methyldimethoxysilane or glycidyloxypropyltriethoxysilane, methacryloyl- or acryloyl-functional silanes such as 3-methacryloyloxypropyl-trimethoxysilane, methacryloyloxypropyl-triethoxysilane, 3-acryloyloxypropyl-trimethoxysilane or acryloyloxypropyl-triethoxysilane, or urea-functional silanes such as N-(3-trimethoxysilylpropyl)urea or N-(3-triethoxysilylpropyl)urea.

The component (B) used in the invention preferably comprises tetraethoxysilane, vinyltrialkoxysilanes, alkyltrialkoxysilanes or aryltrialkoxysilanes, with particular preference being given to methyl-, ethyl-, propyl-, vinyl- or phenyltrimethoxysilanes or methyl-, ethyl-, propyl-, vinyl- or phenyltriethoxysilanes, more particularly vinyltrimethoxysilane or phenyltrimethoxysilane.

The composition (Z) of the invention preferably contains silanes (B) in amounts of at least 0.2 part by weight, more preferably in amounts of at least 0.5 part by weight, and especially in amounts of at least 1 part by weight, based in each case on 100 parts by weight of component (A).

The composition (Z) of the invention preferably contains silanes (B) in amounts of at most 30 parts by weight, more preferably in amounts of at most 20 parts by weight, and especially in amounts of at most 15 parts by weight, based in each case on 100 parts by weight of component (A).

Examples of radical $R^5$ are the examples indicated for radical R.

Radical $R^5$ preferably comprises monovalent hydrocarbon radicals having 1 to 6 carbon atoms, more particularly alkyl radicals having 1 or 2 carbon atoms.

Examples of radical $R^6$ are the examples of optionally substituted hydrocarbon radicals that were indicated for radical R.

Radical $R^6$ preferably comprises monovalent hydrocarbon radicals having 1 to 6 carbon atoms, more particularly the methyl radical.

Examples of the radicals $R^7$ and $R^8$ are, independently of one another, the examples having 1 to 6 carbon atoms that were indicated for radical R.

The radicals $R^7$ and $R^8$ are preferably, independently of one another, hydrogen or monovalent hydrocarbon radicals having 1 to 6 carbon atoms, more particularly hydrogen atom or methyl, ethyl, propyl, butyl or cyclohexyl radical.

Examples of component (C) are α-functional carbamato-silanes such as N-trimethoxysilylmethyl-O-methylcarbamate, N-methyldimethoxysilylmethyl-O-methylcarbamate, N-triethoxysilylmethyl-O-ethylcarbamate or N-methyldiethoxysilylmethyl-O-ethylcarbamate, α-functional methacryloyl- or acryloylsilanes such as methacryloyloxymethyl-trimethoxysilane, methacryloyloxymethyl-methyldimethoxysilane, methacryloyloxymethyl-triethoxysilane, methacryloyloxymethyl-methyldiethoxysilane, acryloyloxymethyl-trimethoxysilane, acryloyloxymethyl-methyldimethoxysilanes, acryloyloxymethyl-triethoxysilane and acryloyloxymethyl-methyldiethoxysilane, α-functional carboxysilanes such as acetoxymethyltrimethoxysilane or acetoxymethyltriethoxysilane, or α-functional aminosilanes such as N-butylaminomethyl-trimethoxysilane, N-alkylaminomethyl-triethoxysilane, N-alkylaminomethyl-methyldimethoxysilane or N-alkylaminomethyl-methyldiethoxysilane, with alkyl typically being a linear or cyclic hydrocarbon radical having 1 to 10 carbon atoms.

Particularly typical examples are the above-stated α-functional carbamatosilanes, more particularly the N-trimethoxysilylmethyl-O-methylcarbamate. If a component (C) is present in the compositions (Z) of the invention, it is preferably a carbamate-functional silane, which may be formed as a byproduct in the preparation of the component (A), if that preparation takes place using an isocyanato-functional silane of the formula (VII) in excess, which is subsequently scavenged with an alcohol and reacted.

The composition (Z) of the invention preferably contains silanes (C) in amounts of at most 1.5 parts by weight, more preferably in amounts of at most 1 part by weight, based in each case on 100 parts by weight of component (A). Ideally the composition (Z) of the invention contains no silane (C), this being technically difficult to accomplish.

Based on 100 parts by weight of component (A), the composition (Z) may comprise small amounts of a silane (C) of the formula (III) in which X is a group —NR$^7$—CO—OR$^8$, R$^7$ is hydrogen atom and R$^8$ is a monovalent, optionally substituted hydrocarbon radical having 1 to 6 carbon atoms, since this silane may be formed as a byproduct in the preparation of the component (A), if the isocyanato-functional silane of the formula (VII) used in this preparation is employed in excess, to achieve a very largely complete and rapid reaction, and this excess is subsequently scavenged with an alcohol $R^8OH$ and reacted, as described in EP 1 896 523 B1 (paragraphs [0008]-[0047] and also claim 1).

In one particularly preferred embodiment of the invention the composition (Z) is not admixed with any additional silane (C) but may still contain the above-stated silane of the formula (III) which is formed as a byproduct in the preparation of the component (A) from a silane of the formula (VII) and which is present in the composition (Z) at not more than 2 parts by weight, preferably not more than 1.5 parts by weight, more preferably not more than 1 part by weight, based in each case on 100 parts by weight of component (A).

Further to the components (A) and (B) and also optionally (C), the compositions (Z) of the invention may comprise further substances, which are different from the components (A), (B) and (C), such as, for example, (D) organosilicon compounds not having nitrogen atoms bonded directly to carbonyl groups, (E) fillers, (F) silicone resins, (G) catalysts, (H) inert plasticizers, (I) additives and (J) adjuvants.

The organosilicon compounds (D) optionally present in the compositions (Z) of the invention are preferably organosilicon compounds comprising units of the formula $$D_dSi(OR^9)_eR^{10}_fO_{(4-d-e-f)/2} \quad (IX),$$

in which $R^9$ may be identical or different and is hydrogen or an optionally substituted hydrocarbon radical, D may be identical or different and is a monovalent, SiC-bonded, radical containing nitrogen atoms which are not directly bonded to a carbonyl group, and in which neither nitrogen nor any other heteroatom is separated only by a single carbon atom from the silyl group, $R^{10}$ may be identical or different and is an alkyl radical or a phenyl radical, d is 0, 1, 2 or 3, preferably 1, e is 0, 1, 2 or 3, preferably 1, 2 or 3, more preferably 2 or 3, and f is 0, 1, 2 or 3, preferably 1 or 0, with the proviso that the sum of d+e+f is less than or equal to 4 and there is at least one radical D present per molecule.

The organosilicon compounds (D) used in the invention may be silanes, i.e., compounds of the formula (IX) with d+e+f=4, and may be siloxanes, i.e., compounds containing units of the formula (IX) with d+e+f s 3, and preferably are silanes.

Examples of radicals $R^9$ are the examples indicated for radical R.

The radicals $R^9$ preferably comprise hydrogen or hydrocarbon radicals optionally substituted by halogen atoms and having 1 to 18 carbon atoms, and more preferably comprise hydrogen atom or hydrocarbon radicals having 1 to 10 carbon atoms, and more particularly comprise methyl or ethyl radical.

Examples of radical $R^{10}$ are the examples of alkyl radicals as indicated for R, and the methyl radical is preferred.

Examples of radicals D are radicals of the formulae $H_2N(CH_2)_3—$, $H_2N(CH_2)_2NH(CH_2)_3—$, $H_2N(CH_2)_2NH(CH_2)_2NH(CH_2)_3—$, $H_3CNH(CH_2)_3—$, $C_2H_5NH(CH_2)_3—$, $C_3H_7NH(CH_2)_3—$, $C_4H_9NH(CH_2)_3—$, $C_5H_{11}NH(CH_2)_3—$, $C_6H_{13}NH(CH_2)_3—$, $C_7H_{15}NH(CH_2)_3—$, $H_2N(CH_2)_4—$, $H_2N—CH_2—CH(CH_3)—CH_2—$, $H_2N(CH_2)_5—$, cyclo-$C_5H_9NH(CH_2)_3—$, cyclo-$C_6H_{11}NH(CH_2)_3—$, phenyl-NH $(CH_2)_3—$, $(CH_3)_2N(CH_2)_3—$, $(C_2H_5)_2N(CH_2)_3—$, $(C_3H_7)_2$ $N(CH_2)_3—$, $(C_4H_9)_2N(CH_2)_3—$, $(C_5H_{11})_2N(CH_2)_3—$, $(C_6H_{13})_2N(CH_2)_3—$, $(C_7H_{15})_2N(CH_2)_3—$, $(CH_{30})_3Si$ $(CH_2)_3NH(CH_2)_3—$, $(C_2H_{50})_3Si(CH_2)_3NH(CH_2)_3—$, $(CH_{30})_2(CH_3)Si(CH_2)_3NH(CH_2)_3—$ and $(C_2H_{50})_2(CH_3)Si$ $(CH_2)_3NH(CH_2)_3—$, and also reaction products of the above-stated primary amino groups with compounds which contain epoxide groups or double bonds that are reactive toward primary amino groups.

Radical D preferably comprises the $H_2N(CH_2)_3—$, $H_2N$ $(CH_2)_2NH(CH_2)_3—$ or cyclo-$C_6H_{11}NH(CH_2)_3—$ radical.

Examples of the silanes of the formula (IX) used optionally in the invention are $H_2N(CH_2)_3—Si(OCH_3)_3$, $H_2N$ $(CH_2)_3—Si(OC_2H_5)_3$, $H_2N(CH_2)_3—Si(OCH_3)_2CH_3$, $H_2N$ $(CH_2)_3—Si(OC_2H_5)_2CH_3$, $H_2N(CH_2)_2NH(CH_2)_3—Si$ $(OCH_3)_3$, $H_2N(CH_2)_2NH(CH_2)_3—Si(OC_2H_5)_3$, $H_2N(CH_2)_2$ $NH(CH_2)_3—Si(OCH_3)_2CH_3$, $H_2N(CH_2)_2NH(CH_2)_3—Si$ $(OC_2H_5)_2CH_3$, $H_2N(CH_2)_2NH(CH_2)_2NH(CH_2)_3—Si$ $(OCH_3)_3$, $H_2N(CH_2)_2NH(CH_2)_2NH(CH_2)_3—Si(OC_2H_5)_3$, cyclo-$C_6H_{11}NH(CH_2)_3—Si(OCH_3)_3$, cyclo-$C_6H_{11}NH$ $(CH_2)_3—Si(OC_2H_5)_3$, cyclo-$C_6H_{11}NH(CH_2)_3—Si(OCH_3)_2$ $CH_3$, cyclo-$C_6H_{11}NH(CH_2)_3—Si(OC_2H_5)_2CH_3$, phenyl-$NH(CH_2)_3—Si(OCH_3)_3$, phenyl-$NH(CH_2)_3—Si(OC_2H_5)_3$, phenyl-$NH(CH_2)_3—Si(OCH_3)_2CH_3$, phenyl-$NH(CH_2)_3—$ $Si(OC_2H_5)_2CH_3$, $HN((CH_2)_3—Si(OCH_3)_3)_2$, $HN((CH_2)_3—$ $Si(OC_2H_5)_3)_2$, $HN((CH_2)_3—Si(OCH_3)_2CH_3)_2$ and $HN((CH_2)_3—Si(OC_2H_5)_2CH_3)_2$ and also their partial hydrolysates, with preference being given to $H_2N(CH_2)_3—Si$ $(OCH_3)_3$, $H_2N(CH_2)_3—Si(OC_2H_5)_3$, $H_2N(CH_2)_3—Si$ $(OCH_3)_2CH_3$, $H_2N(CH_2)_3—Si(OC_2H_5)_2CH_3$, $H_2N(CH_2)_2$ $NH(CH_2)_3—Si(OCH_3)_3$, $H_2N(CH_2)_2NH(CH_2)_3—Si$ $(OC_2H_5)_3$, $H_2N(CH_2)_2NH(CH_2)_3—Si(OCH_3)_2CH_3$, cyclo-$C_6H_{11}NH(CH_2)_3—Si(OCH_3)_3$, cyclo-$C_6H_{11}NH(CH_2)_3—Si$ $(OC_2H_5)_3$ or cyclo-$C_6H_{11}NH(CH_2)_3—Si(OCH_3)_2CH_3$ and/or in each case their partial hydrolysates, and particular preference being given to $H_2N(CH_2)_3—Si(OCH_3)_3$, $H_2N$ $(CH_2)_3—Si(OC_2H_5)_3$, $H_2N(CH_2)_3—Si(OCH_3)_2CH_3$, $H_2N$ $(CH_2)_3—Si(OC_2H_5)_2CH_3$, $H_2N(CH_2)_2NH(CH_2)_3—Si$ $(OCH_3)_3$, $H_2N(CH_2)_2NH(CH_2)_3—Si(OCH_3)_2CH_3$, cyclo-$C_6H_{11}NH(CH_2)_3—Si(OCH_3)_3$ or cyclo-$C_6H_{11}NH(CH_2)_3—$ $Si(OCH_3)_2CH_3$ and/or in each case their partial hydrolysates.

The organosilicon compounds (D) used optionally in the invention may also take on the function of a curing catalyst or curing cocatalyst in the compositions (Z) of the invention.

Furthermore, the organosilicon compounds (D) used optionally in the invention may act as adhesion promoters and/or as water scavengers.

The organosilicon compounds (D) used optionally in the invention are standard commercial products or may be produced by methods common within chemistry.

If the compositions (Z) of the invention comprise component (D), the amounts are preferably 0.01 to 25 parts by weight, more preferably 0.1 to 10 parts by weight, and most preferably 0.5 to 5 parts by weight, based in each case on 100 parts by weight of component (A). The compositions (Z) of the invention preferably do comprise component (D).

The fillers (E) used optionally in the compositions (Z) of the invention may be any desired fillers known to date.

Examples of fillers (E) are non-reinforcing fillers, these being fillers having a BET surface area of preferably up to 50 $m^2/g$, such as quartz, diatomaceous earth, calcium silicate, zirconium silicate, talc, kaolin, zeolites, metal oxide powders, such as oxides of aluminum, of titanium, of iron or of zinc and also mixed oxides thereof, barium sulfate, precipitated and/or ground chalk, which may be either coated or uncoated, gypsum, silicon nitride, silicon carbide, boron nitride, glass powder and plastics powder, such as polyacrylonitrile powder; reinforcing fillers, these being fillers having a BET surface area of more than 50 m²/g, such as fumed silica, precipitated silica, precipitated chalk, carbon black, such as furnace black and acetylene black, and mixed silicon aluminum oxides of high BET surface area; aluminum trihydroxide, fillers in the form of hollow beads, such as ceramic microbeads, examples being those available under the tradename Zeeospheres™ from 3M Deutschland GmbH of Neuss, DE, elastic polymeric beads, for instance those available under the tradename EXPANCEL® from AKZO NOBEL, Expancel of Sundsvall, Sweden, or glass beads; fibrous fillers, such as asbestos and also polymeric fibers. The stated fillers may have been hydrophobized, by treatment with organosilanes and/or organosiloxanes or with stearic acid, or by etherification of hydroxyl groups to form alkoxy groups, for example.

The fillers (E) optionally used are preferably ground and/or precipitated chalk, which may be either coated or uncoated, talc, aluminum trihydroxide, and silica, with calcium carbonate and aluminum trihydroxide being particularly preferred. Preferred calcium carbonate grades are ground or precipitated and optionally surface-treated with fatty acids such as stearic acid or salts thereof. The preferred silica is preferably fumed silica.

Fillers (E) used optionally have a moisture content of preferably below 1 wt %, more preferably of below 0.5 wt %.

If the compositions (Z) of the invention comprise fillers (E), the amounts are preferably 10 to 1000 parts by weight, more preferably 50 to 500 parts by weight, more particularly 70 to 200 parts by weight, based in each case on 100 parts by weight of constituent (A). The compositions (Z) of the invention preferably comprise fillers (E).

In one particular embodiment of the invention the compositions (Z) of the invention comprise, as fillers (E), calcium carbonate, aluminum trihydroxide and/or talc, or else a combination of a) silica, more particularly fumed silica, and b) calcium carbonate, aluminum trihydroxide and/or talc.

In another particular embodiment of the invention the compositions (Z) of the invention comprise, as fillers (E), a combination of a) precipitated chalk and b) ground chalk.

The silicone resins (F) used optionally in the compositions (Z) of the invention are preferably phenyl silicone resins.

Examples of phenyl silicone resins which can be used as components (F) are standard commercial products, examples being various SILRES® grades from Wacker Chemie AG, such as SILRES® IC 368, SILRES® IC 678 or SILRES® IC 231 or SILRES® SY231. Suitable silicone resins are described in detail in the description and also the examples of WO2015/158624. The sections of WO2015/158624 concerned with the description of silicone resins are therefore deemed part of the disclosure content of this description.

If the compositions (Z) of the invention comprise resins (F), the amounts are at least parts by weight, more preferably at least 10 parts by weight, most preferably at least 50 parts by weight, and preferably at most 1000 parts by weight, more preferably at most 500 parts by weight, and especially at most 300 parts by weight, based in each case on 100 parts by weight of component (A).

The catalysts (G) used optionally in the compositions (Z) of the invention may be any desired catalysts different from component (D) and known to date for compositions which cure by silane condensation.

Examples of metal-containing curing catalysts (G) are organotitanium and organotin compounds, examples being titanic esters, such as tetrabutyl titanate, tetrapropyl titanate, tetraisopropyl titanate and titanium tetraacetylacetonate; tin compounds, such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (G) are basic compounds, such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis(N,N-dimethyl-2-aminoethyl)methylamine, pentamethylguanidine, tetramethylguanidine and also other guanidine derivatives, N,N-dimethylcyclohexylamine, N,N-dimethylphenylamine and N-ethylmorpholinine.

Likewise employable as catalyst (G) are acidic compounds, such as, for example, phosphoric acid and its esters, toluene sulfonic acid, sulfuric acid, nitric acid or else organic carboxylic acids, examples being acetic acid and benzoic acid.

In one preferred embodiment of the invention the compositions (Z) of the invention contain less than 0.5 wt %, more preferably less than 0.2 wt %, and most preferably less than 0.05 wt % of tin-containing catalysts (G), based in each case on the total mass of the composition (Z).

In one particularly preferred embodiment of the invention the compositions (Z) of the invention are free from tin-containing catalysts.

In one especially preferred embodiment of the invention the compositions (Z) of the invention are free from metal-containing catalysts.

If the compositions (Z) of the invention comprise catalysts (G), the amounts are preferably 0.01 to 20 parts by weight, more preferably 0.05 to 5 parts by weight, based in each case on 100 parts by weight of constituent (A). The compositions (Z) of the invention preferably comprise no catalysts (G).

The inert plasticizers (H) used optionally in the compositions (Z) of the invention may be any desired plasticizers known to date that are typical for silane-crosslinking systems.

Examples of inert plasticizers (H) are phthalic esters (e.g., dioctyl phthalate, diisooctyl phthalate and diundecyl phthalate), perhydrogenated phthalic esters (e.g., diisononyl 1,2-cyclohexane dicarboxylate and dioctyl 1,2-cyclohexane dicarboxylate), adipic esters (e.g., dioctyl adipate), benzoic esters, glycol esters, esters of saturated alkanediols (e.g., 2,2,4-trimethyl-1,3-pentanediol monoisobutyrates and 2,2,4-trimethyl-1,3-pentanediol diisobutyrates), phosphoric esters, sulfonic esters, polyesters, polyethers (e.g., polyethylene glycols and polypropylene glycols having molar masses $M_n$ of preferably 400 to 10 000 g/mol), polystyrenes, polybutadienes, polyisobutylenes, paraffinic hydrocarbons, and branched hydrocarbons of high molecular mass.

If the compositions (Z) of the invention comprise inert plasticizers (H), the amounts are preferably 0.01 to 100 parts by weight, based on 100 parts by weight of component (A).

In one particularly advantageous embodiment of the invention the compositions (Z) of the invention do comprise inert plasticizers (H).

The additives (I) used optionally in the compositions (Z) of the invention may be any desired additives known to date and typical for silane-crosslinking systems.

The additives (I) used optionally in the invention are preferably antioxidants, UV stabilizers, such as HALS compounds as they are called, for example, fungicides, or pigments.

If the compositions (Z) of the invention comprise additives (I), the amounts are preferably 0.01 to 30 parts by weight, more preferably 0.1 to 10 parts by weight, based in each case on 100 parts by weight of component (A). The compositions (Z) of the invention preferably comprise additives (I), more particularly UV stabilizers and/or HALS compounds.

The adjuvants (J) used optionally in the invention are preferably rheological additives, flame retardants or organic solvents.

The rheological additives (J) are preferably polyamide waxes, hydrogenated castor oils or stearates.

Examples of organic solvents (J) are low molecular mass ethers, esters, ketones, aromatic and aliphatic and also optionally halogen-containing hydrocarbons, or alcohols, the latter being preferred.

Preferably no organic solvents (J) are added to the compositions (Z) of the invention.

If the compositions (Z) of the invention comprise one or more components (J), the amounts involved are preferably in each case 0.5 to 200 parts by weight, more preferably 1 to 100 parts by weight, and most preferably 2 to 70 parts by weight, based in each case on 100 parts by weight of component (A).

The compositions (Z) of the invention are preferably compositions comprising (A) 100 parts by weight of polymers of the formula (I),
(B) 0.2 to 30 parts by weight of silanes selected from tetraethoxysilane and silanes of the formula (II),
(C) not more than 2 parts by weight of silanes of the formula (III),
(D) 0.01 to 25 parts by weight of organosilicon compounds comprising units of the formula (IX),
optionally (E) fillers,
optionally (F) silicone resins,
optionally (G) catalysts,
optionally (H) inert plasticizers,
optionally (I) additives and
optionally (J) adjuvants.

The compositions (Z) of the invention are more preferably compositions comprising (A) 100 parts by weight of polymers of the formula (I),
(B) 0.2 to 30 parts by weight of silanes selected from tetraethoxysilane and silanes of the formula (II),
(C) not more than 1.5 parts by weight of silanes of the formula (III),
(D) 0.1 to 10 parts by weight of organosilicon compounds comprising units of the formula (IX),
optionally (E) fillers,
optionally (F) silicone resins,
optionally (G) catalysts, with the compositions (Z) containing less than 0.05 wt % of tin catalysts, based on the total mass of the compositions (Z),
optionally (H) inert plasticizers,
optionally (I) additives and
optionally (J) adjuvants.

The compositions (Z) of the invention are especially preferably compositions comprising (A) 100 parts by weight of polymers of the formula (I),
(B) 0.2 to 30 parts by weight of silanes of the formula (II), (C) not more than 1.5 parts by weight of silanes of the formula (III), (D) 0.1 to 10 parts by weight of organosilicon compounds comprising units of the formula (IX),
(E) 10 to 1000 parts by weight of fillers,
optionally (F) silicone resins,
optionally (G) catalysts, with the compositions (Z) containing less than 0.05 wt % of tin catalysts, based on the total mass of the compositions (Z),
optionally (H) inert plasticizers,
optionally (I) additives and
optionally (J) adjuvants.

The compositions (Z) of the invention preferably comprise no constituents other than the components (A) to (J).

Each of the components used in the invention may comprise one kind of any such component or else a mixture of at least two kinds of a respective component.

The compositions (Z) of the invention are preferably formulations preferably having viscosities of 500 to 1,000, 000 mPas, more preferably of 1000 to 500,000 mPas, and most preferably 5000 to 100,000 mPas, in each case at 25° C.

The compositions (Z) of the invention are preferably liquid or pasty compositions.

The compositions (Z) of the invention are moisture-curing, meaning that in the absence of water they are storage-stable and cure on contact with water and/or atmospheric moisture.

The compositions (Z) of the invention may be produced in any desired way known per se, in accordance, for instance, with methods and mixing techniques of a kind customary for the preparation of moisture-curing compositions.

A further subject of the present invention is a method for producing the compositions (Z) of the invention by mixing the individual components in any desired order. In that case, preferably, the catalytically active components (D) and/or (G) optionally used are only added at the end of the mixing procedure.

This mixing may take place at temperatures between 0 and 30° C. under the pressure of the surrounding atmosphere, in other words about 900 to 1100 hPa. If desired, however, this mixing may also take place at higher temperatures, such as at temperatures in the range from 30 to 130° C. It is also possible to carry out mixing temporarily or continually under reduced pressure, such as at an absolute pressure of 30 to 500 hPa, for example, in order to remove volatile compounds and/or air.

The mixing according to the invention preferably takes place in the absence of moisture.

The method of the invention may be carried out continuously or discontinuously.

The compositions (Z) of the invention are preferably one-component compositions which are storable in the absence of water and which are crosslinkable on ingress of water at room temperature. Alternatively the compositions (Z) of the invention may also be part of two-component crosslinking systems, in which OH-containing compounds, such as water, are added in a second component.

The customary water content of the air is sufficient for crosslinking the compositions (Z) of the invention. The compositions (Z) of the invention are crosslinked preferably at room temperature. Alternatively, if desired, they may be crosslinked at higher or lower temperatures than room temperature, such as at −5° to 15° C. or at 30° to 50° C., and/or by means of concentrations of water that exceed the normal water content of the air.

The crosslinking is carried out preferably under a pressure of 100 to 1100 hPa, more preferably under the pressure of the surrounding atmosphere, i.e., about 900 to 1100 hPa.

The compositions (Z) of the invention may be used for all purposes for which crosslinkable compositions based on organosilicon compounds have also been employed to date, preferably as adhesives or sealants, more preferably as sealants, more particularly as sealants for joints.

Where the compositions (Z) are used as sealants for joints, the joints to be sealed may consist of any of a wide variety of different materials, such as, for example, of stone, concrete, mineral substrates, metals, glass, ceramic, wood, and painted surfaces, but also plastics, including PVC. In these cases the edges of the joint may consist either of the same or of different materials.

A further subject of the invention are shaped articles produced by crosslinking the compositions (Z) of the invention or compositions (Z) produced in the invention.

In one preferred embodiment the shaped articles of the invention preferably have a 100% modulus of 0.1-1.4 MPas, more preferably of 0.15-0.5 MPas, elongations at break of preferably at least 200%, more preferably of at least 400%, and a resilience of preferably at least 70%.

The shaped articles of the invention may be any desired shaped articles, such as, for instance, gaskets, compression moldings, extruded profiles, coatings, impregnations, encapsulation, lenses, prisms, polygonal structures, laminate layers or adhesive layers.

A further subject of the invention is a method for adhesively bonding substrates, wherein the composition (Z) of the invention is applied to the surface of at least one substrate, this surface is then contacted with the second substrate for bonding, and the assembly is subsequently allowed to crosslink.

Examples of substrates which may be bonded in the invention are concrete, mineral substrates, metals, glass, ceramic and painted surfaces, wood, and also plastics, including PVC. Both identical and different materials may be bonded to one another.

One preferred application is the bonding of wood flooring to customary substrates such as screed or concrete.

A further subject of the invention is a method for producing assemblies of materials, wherein the composition (Z) of the invention is applied to at least one substrate and is subsequently allowed to crosslink. Examples thereof are coatings, encapsulation, such as encapsulating compounds for LEDs or other electronic components, for example.

The compositions (Z) of the invention possess the advantage that they are easy to produce.

Furthermore, the compositions (Z) of the invention have the advantage that they can be used to produce sealants crosslinkable without tin and having outstanding properties.

The compositions (Z) of the invention have the advantage that they are notable for very high storage stability and a high or even very high crosslinking rate even in the absence of tin catalysts.

The compositions (Z) of the invention have the advantage, furthermore, that they exhibit an excellent adhesion profile.

Furthermore, the crosslinkable compositions (Z) of the invention have the advantage that they are easy to process.

Furthermore, the crosslinkable compositions (Z) of the invention have the advantage that they can be used to obtain tin-free shaped articles, more particularly tin-free sealants, having a low modulus and good resilience.

In the examples described hereinafter, all viscosity figures are based on a temperature of 25° C. Unless otherwise indicated, the examples below are carried out under the pressure of the surrounding atmosphere, in other words approximately at 1000 hPa, and at room temperature, in other words at approximately 23° C., or at a temperature which comes about when the reactants are combined at room temperature without additional heating or cooling, and also are carried out at a relative atmospheric humidity of approximately 50%. Furthermore, all figures for parts and percentages, unless otherwise indicated, refer to weight.

EXAMPLES

Example 1: Preparation of Isocyanatomethyl-Trimethoxysilane

The isocyanatomethyl-trimethoxysilane is prepared in a thin-film evaporator having a length of 25 cm, an internal diameter of 8 cm, and a wall temperature of 300° C.

400 g of N-trimethoxysilylmethyl-O-methylcarbamate (available commercially as GENIOSIL® XL 63 from Wacker Chemie A G, Munich, DE) are admixed with 0.28 g of dioctyltin dilaurate. The metering takes place at a rate of 110 ml/h at the upper end of the thin-film evaporator. A nitrogen stream of 65 l/h is passed from bottom to top, i.e., against the direction of travel of the reaction mixture. Under these conditions, the outflow at the bottom is only around 10% of the amount of silane metered in. The evaporated product mixture is passed together with the stream of nitrogen through a 10 cm long Vigreux column insulated by means of a vacuum jacket, with the liquid column runback being passed back into the thin-film evaporator. The temperature at the top of the Vigreux column is 158-164° C. The thermalized silane mixture is condensed selectively from this gas stream by means of a conventional glass condenser, at a temperature of 54° C. In a second condensation step, the methanol is then condensed out at a temperature of 0° C., before the stream of nitrogen is passed through a cold trap into the air extraction of the laboratory fume hood in which the entire setup is located. The silane mixture obtained is stored at −20° C.

The process is repeated exactly two further times and the two condensed silane mixtures obtained are united. A total of 988 g of condensed silane mixture are obtained. The colorless liquid is analyzed by means of $^1$H-NMR and gas chromatography. It contains 31.8% isocyanatomethyl-trimethoxysilane, 67.9% N-trimethoxysilylmethyl-O-methylcarbamate and 0.1% methanol.

A subsequent fractional distillation affords 249 g of isocyanatomethyl-trimethoxysilane in a purity of 98.9%.

Example 2: Model Reaction: Reaction of a Mixture of α- and γ-Isocyanatosilanes with a Short-Chain Polypropylene Glycol A 250 ml reaction vessel with dropping funnel and with stirring, cooling and heating facilities is charged with 50.0 g (125 mmol) of a linear polypropylene glycol having an average molar mass $M_n$ of 400 g/mol (available commercially from Sigma-Aldrich) and this initial charge is dried with stirring for 2 h at 80° C. and 1 mbar.

Thereafter 0.022 g (150 ppm, based on the reaction mixture following complete addition of all the components) of a bismuth-containing catalyst (available commercially under the name Borchi® Kat 315 from Borchers GmbH, Langenfeld, DE) is added and subsequently a mixture of 44.3 g (250 mmol) of isocyanatomethyl-trimethoxysilane (prepared according to example 1) and 51.3 g (250 mmol) of 3-isocyanatopropyl-trimethoxysilane (available commercially under the name GENIOSIL® GF 40 from Wacker Chemie A G, Munich, DE) is added dropwise with stirring over the course of 15 min. Because the reaction is highly exothermic, this must be carried out with cooling, so as to stay within a reaction temperature of 80° C. This is followed by stirring at 80° C. for a further 30 min.

A subsequent 1H-NMR analysis of the reaction mixture shows that within the bounds of measurement accuracy (±~5%) there are as many chain ends terminated with the γ-isocyanatosilane as there are chain ends terminated with the α-isocyanatosilane. Both isocyanatosilanes therefore possess identical reactivity toward OH-terminated polypropylene glycols within the bounds of measurement accuracy. Since the two chain ends react independently of one another, 50% of the polymers have both α- and γ-silane terminations.

Example 3a: Polymer A: Polypropylene Glycol with 30% α-Trimethoxysilylmethyl End Groups and 70% γ-Trimethoxysilylpropyl End Groups A 2000 ml reaction vessel with stirring, cooling and heating facilities is charged with 1800.0 g (100 mmol) of a linear polypropylene glycol having an average molar mass $M_n$ of 18,000 g/mol (available commercially under the name Acclaim 18200 from Covestro A G, Leverkusen, DE) and this initial charge is dried with stirring for 2 h at 80° C. and 1 mbar.

The vessel contents are cooled to room temperature and then 12.8 g (72 mmol) of isocyanatomethyl-trimethoxysilane (prepared according to example 1) and 34.5 g (168 mmol) of 3-isocyanatopropyl-trimethoxysilane (available commercially under the name GENIOSIL® GF 40 from Wacker Chemie A G, Munich, DE) are added. The mixture is heated to 80° C. with stirring. Thereafter 0.24 g (150 ppm) of a bismuth-containing catalyst (available commercially under the name Borchi® Kat 315 from Borchers GmbH, Langenfeld, DE) is added, with the reaction mixture heating up to 84-85° C. The reaction mixture is stirred at 80° C. for a further 120 min.

It is subsequently cooled to 60° C., 1.92 g (60 mmol) of methanol are added, and stirring takes place at 60° C. for a further 30 min. No remaining isocyanate groups are detectable by IR spectroscopy in the resulting polymer mixture. The polymer mixture obtained is clear and transparent and has a viscosity at 25° C. of 25 Pas. It can be processed further without problems.

Example 3b: Polymer B: Polypropylene Glycol with 35% α-Trimethoxysilylmethyl End Groups and 65% γ-Trimethoxysilylpropyl End Groups The procedure adopted is that described in example 3a, but, based on 1800.0 g (100 mmol) of a linear polypropylene glycol having an average molar mass $M_n$ of 18,000 g/mol, 14.9 g (84 mmol) of isocyanatomethyl-trimethoxysilane and 32.0 g (156 mmol) of 3-isocyanatopropyl-trimethoxysilane are used.

In the resulting polymer mixture, no remaining isocyanate groups are detectable by IR spectroscopy after the addition of 1.92 g (60 mmol) of methanol as described in example 3a. The polymer mixture obtained is clear and transparent and has a viscosity at 25° C. of 25 Pas. It can be processed further without problems.

Example 3c: Polymer C: Polypropylene Glycol with 40% α-Trimethoxysilylmethyl End Groups and 60% γ-Trimethoxysilylpropyl End Groups The procedure adopted is that described in example 3a, but, based on 1800.0 g (100 mmol) of a linear polypropylene glycol having an average molar mass $M_n$ of 18,000 g/mol, 17.0 g (96 mmol) of isocyanatomethyl-trimethoxysilane and 29.6 g (144 mmol) of 3-isocyanatopropyl-trimethoxysilane are used.

In the resulting polymer mixture, no remaining isocyanate groups are detectable by IR spectroscopy after the addition of 1.92 g (60 mmol) of methanol as described in example 3a. The polymer mixture obtained is clear and transparent and has a viscosity at 25° C. of 25 Pas. It can be processed further without problems.

Example 3d: Polymer D: Polypropylene Glycol with 50% α-Trimethoxysilylmethyl End Groups and 50% γ-Trimethoxysilylpropyl End Groups The procedure adopted is that described in example 3a, but, based on 1800.0 g (100 mmol) of a linear polypropylene glycol having an average molar mass $M_n$ of 18,000 g/mol, 21.3 g (120 mmol) of isocyanatomethyl-trimethoxysilane and 24.6 g (120 mmol) of 3-isocyanatopropyl-trimethoxysilane are used.

In the resulting polymer mixture, no remaining isocyanate groups are detectable by IR spectroscopy after the addition of 1.92 g (60 mmol) of methanol as described in example 3a. The polymer mixture obtained is clear and transparent and has a viscosity at 25° C. of 25 Pas. It can be processed further without problems.

Example 3e: Polymer E (not Inventive): Polypropylene Glycol with 70% α-Trimethoxysilylmethyl End Groups and 30% γ-Trimethoxysilylpropyl End Groups The procedure adopted is that described in example 3a, but, based on 1800.0 g (100 mmol) of a linear polypropylene glycol having an average molar mass $M_n$ of 18,000 g/mol, 29.8 g (168 mmol) of isocyanatomethyl-trimethoxysilane and 14.8 g (72 mmol) of 3-isocyanatopropyl-trimethoxysilane are used.

In the resulting polymer mixture, no remaining isocyanate groups are detectable by IR spectroscopy after the addition of 1.92 g (60 mmol) of methanol as described in example 3a. The polymer mixture obtained is clear and transparent and has a viscosity at 25° C. of 25 Pas. It can be processed further without problems.

Example 3f: Polymer F (not Inventive): Polypropylene Glycol with 100% α-Trimethoxysilylmethyl End Groups The procedure adopted is that described in example 3a, but, based on 1800.0 g (100 mmol) of a linear polypropylene glycol having an average molar mass $M_n$ of 18,000 g/mol, 42.5 g (240 mmol) of isocyanatomethyl-trimethoxysilane and no 3-isocyanatopropyl-trimethoxysilane are used.

In the resulting polymer mixture, no remaining isocyanate groups are detectable by IR spectroscopy after the addition of 1.92 g (60 mmol) of methanol as described in example 3a. The polymer mixture obtained is clear and transparent and has a viscosity at 25° C. of 25 Pas. It can be processed further without problems.

Example 4a: Production of a 1K Adhesive Formulation 116.0 g of polymer A from example 3a are homogenized for two minutes at 200 rpm in a laboratory planetary mixer from PC-Laborsystem, equipped with two cross-arm mixers, at around 25° C. with 80.0 g of diisoundecyl phthalate (available commercially from ExxonMobil) and 8.0 g of vinyltrimethoxysilane (available commercially as GENIO-SIL® XL 10 from Wacker Chemie A G, Munich, DE).

Thereafter 192.0 g of a ground calcium carbonate coated with stearic acid and having a mean particle diameter (D50%) of around 0.4 μm (available commercially under the name Omyabond 302 from Omya, Cologne, DE) are added and worked in for one minute with stirring at 600 rpm. Lastly 4.0 g of 3-aminopropyl-trimethoxysilane (available commercially as GENIOSIL® GF 96 from Wacker Chemie AG, Munich, DE) are incorporated by mixing for one minute at 200 rpm and the mixture is homogenized for one minute at 200 rpm in a partial vacuum (around 100 mbar) and stirred until bubble-free.

The resulting composition is dispensed into two 310 ml PE cartridges (around 200 g per cartridge). One cartridge is stored at 20° C. for 24 hours prior to analysis. The second cartridge is stored at 20° C. for 14 days prior to analysis.

Example 4b: Production of a 1K Adhesive Formulation

The procedure adopted is that described in example 4a, but instead of the polymer A from example 3a, the identical amount of polymer B from example 3b is used.

Here again, two cartridges are obtained, which are stored at 20° C. for 24 h or for 14 days, respectively, prior to analysis.

Example 4c: Production of a 1K Adhesive Formulation

The procedure adopted is that described in example 4a, but instead of the polymer A from example 3a, the identical amount of polymer C from example 3c is used.

Here again, two cartridges are obtained, which are stored at 20° C. for 24 h or for 14 days, respectively, prior to analysis.

Example 4d: Production of a 1K Adhesive Formulation

The procedure adopted is that described in example 4a, but instead of the polymer A from example 3a, the identical amount of polymer D from example 3d is used. In addition the amount of the 3-aminopropyl-trimethoxysilane used is halved from 4.0 g to 2.0 g.

Here again, two cartridges are obtained, which are stored at 20° C. for 24 h or for 14 days, respectively, prior to analysis.

Example 4e (Not Inventive): Production of a 1K Adhesive Formulation

The procedure adopted is that described in example 4a, but instead of the polymer A from example 3a, the identical amount of polymer E from example 3e is used. In addition the amount of the 3-aminopropyl-trimethoxysilane used is halved from 4.0 g to 2.0 g.

Here again, two cartridges are obtained, which are stored at 20° C. for 24 h or for 14 days, respectively, prior to analysis.

Example 4f (Not Inventive): Production of a 1K Adhesive Formulation

The procedure adopted is that described in example 4a, but instead of the polymer A from example 3a, the identical amount of polymer F from example 3f is used. In addition the amount of the 3-aminopropyl-trimethoxysilane used is halved from 4.0 g to 2.0 g.

Here again, two cartridges are obtained, which are stored at 20° C. for 24 h or for 14 days, respectively, prior to analysis.

Example 4g (not Inventive): Production of a 1K Adhesive Formulation

The procedure adopted is that described in example 4a, but instead of 116 g of polymer A from example 3a, 46.4 g of polymer F from example 3f and 69.6 g of a silane-terminated polypropylene glycol having an average molar mass ($M_n$) of 18,000 g/mol and end groups of the formula —O—C(=O)—NH—$(CH_2)_3$—$Si(OCH_3)_3$ (available commercially under the name GENIOSIL® STP-E35 from Wacker Chemie AG, Munich, DE) are used. In addition the amount of the 3-aminopropyl-trimethoxysilane used is halved from 4.0 g to 2.0 g.

Here again, two cartridges are obtained, which are stored at 20° C. for 24 h or for 14 days, respectively, prior to analysis.

Example 4h (Not Inventive): Production of a 1K Adhesive Formulation

The procedure adopted is that described in example 4a, but instead of the polymer A from example 3a, the identical amount of polymer E from example 3e, and, instead of vinyltrimethoxysilane, an identical amount of N-trimethoxysilylmethyl-O-methylcarbamate (available commercially as GENIOSIL® XL 63 from Wacker Chemie A G, Munich, DE) are used. In addition the amount of the 3-aminopropyl-trimethoxysilane used is halved from 4.0 g to 2.0 g.

Here again, two cartridges are obtained, which are stored at 20° C. for 24 h or for 14 days, respectively, prior to analysis.

Example 4i (Not Inventive): Production of a 1K Adhesive Formulation

The procedure adopted is that described in example 4a, but instead of the polymer A from example 3a, the identical amount of polymer F from example 3f, and, instead of vinyltrimethoxysilane, an identical amount of N-trimethoxysilylmethyl-O-methylcarbamate (available commercially as GENIOSIL® XL 63 from Wacker Chemie A G, Munich, DE) are used. In addition the amount of the 3-aminopropyl-trimethoxysilane used is halved from 4.0 g to 2.0 g.

Here again, two cartridges are obtained, which are stored at 20° C. for 24 h or for 14 days, respectively, prior to analysis.

Example 5: Determination of Properties Profiles of the Adhesives Produced

The adhesives obtained in examples 4a to 4i, if they had not already cured in the cartridge, were allowed to crosslink and were investigated for their skin formation and their mechanical properties. The results are found in table 1.

Skin-Forming Time (SFT)

The skin-forming time is determined by applying a 2 mm-thick layer of the crosslinkable compositions obtained in the examples to PE film and storing the treated film under standard conditions (23° C. and 50% relative humidity). Testing for formation of a skin is carried out once per minute in the course of the curing. For this testing, a dry laboratory spatula is placed carefully onto the surface of the sample and is drawn upward. If sample remains adhering on the spatula, a skin has not yet formed. If sample no longer remains adhering on the spatula, a skin has formed and the time is recorded.

Mechanical Properties

The compositions are each coated out onto milled-out Teflon plates with a depth of 2 mm and are cured for two weeks at 23° C. and 50% relative humidity.

The Shore A hardness is determined according to DIN 53505.

The tensile strength is determined according to DIN 53504-S1.

Elongation at break is determined according to DIN 53504-S1.

The 100% modulus is determined according to DIN 53504-S1.

vin® 765 (CAS No. 41556-26-7), available commercially under the name TINUVIN® B 75 from BASF SE; Ludwigshafen, DE).

Thereafter 102.0 g of a calcium carbonate coated with stearic acid and having a mean particle diameter (D50%) of around 2.0 μm (available commercially under the name Omyabond 520 from Omya, Cologne, DE) and 8 g of a micronized polyamide wax (available commercially under the name Crayvallac® SLC from Arkema, France) are added and are incorporated in one minute with stirring with the cross-arm mixer at 200 rpm. The composition is subsequently heated to 80° C. while stirring at 500 rpm with the cross-arm mixer and 1000 rpm with the dissolver, with the temperature being held for 15 min, followed by cooling back down to 35° C.

Lastly 1.0 g of N-(2-aminoethyl)aminopropyltrimethoxysilane (sold under the name GENIOSIL® GF 9 from Wacker Chemie A G, Munich, DE) is added and the mixture

TABLE 1

| | Example | | | | | | | | |
|---|---|---|---|---|---|---|---|---|---|
| | 4a | 4b | 4c | 4d | 4e* | 4f* | 4g* | 4h* | 4i* |
| | | inventive | | | | | not inventive | | |
| Ratio α:γ | 30:70 | 35:70 | 40:60 | 50:50 | 70:30 | 100:0 | ** | 70:30 | 100:0 |
| Water scavenger | V-TMO | V-TMO | V-TMO | V-TMO | V-TMO | V-TMO | V-TMO | C-TMO | C-TMO |
| Aminosilane content [%] | 1 | 1 | 1 | 0.5 | 0.5 | 0.5 | 0.5 | 0.5 | 0.5 |
| SFT 1 day storage [min] | 32 | 17 | 10 | 3 | 1 | solid*** | solid*** | 6 | 0.5 |
| SFT 24 days storage [min] | 35 | 20 | 12 | 5 | solid*** | solid*** | solid*** | 5 | solid*** |
| Hardness [Shore A] | 39 | 41 | 37 | 37 | 39 | | | 38 | 38 |
| 100% modulus [N/mm] | 1.0 | 1.1 | 0.8 | 0.9 | 1.0 | | | 1.1 | 1.1 |
| Tensile strength [N/mm] | 2.4 | 2.5 | 2.4 | 2.3 | 2.2 | | | 2.1 | 2.1 |
| Elongation at break [%] | 271 | 259 | 288 | 265 | 250 | | | 289 | 288 |

*not inventive
**mixture of 40% of polymer F with 100% α-silane termination and 60% of a polymer with 100% γ-silane termination
***fully cured while still in cartridge V-TMO stands for vinyltrimethoxysilane and C-TMO for N-trimethoxysilylmethyl-O-methylcarbamate.

Example 6a: Production of a 1K Sealant Formulation 30.0 g of polymer A from example 3a are homogenized for two minutes with a cross-arm mixer at 200 rpm in a laboratory planetary mixer from PC-Laborsystem, equipped with the cross-arm mixer and a dissolver, at around 25° C. with 12.0 g of a single-sidedly silane-terminated polypropylene glycol having an average molar mass $M_n$ of 5000 g/mol and end groups of the formula —O—C(=O)—NH—(CH₂)₃—Si(OCH₃)₃ (available commercially under the name GENIOSIL® XM25 from Wacker Chemie AG, Munich, DE), 43.0 g of diisononyl cyclohexane-1,2-dicarboxylate (available commercially under the name "Hexamoll DINCH" from BASF SE; Ludwigshafen, DE), 3.0 g of vinyltrimethoxysilane and 1.0 g of a stabilizer mixture (mixture of 20% Irganox® 1135 (CAS No. 125643-61-0), 40% Tinuvin© 571 (CAS No. 23328-53-2) and 40% Tinuis homogenized for 2 minutes at 600 rpm (cross-arm mixer) and 1000 rpm (dissolver) under partial vacuum (around 100 mbar) and stirred until bubble-free.

The resulting composition is dispensed into a 310 ml PE cartridge and stored for 24 hours at 20° C. prior to analysis.

Example 6b: Production of a 1K Sealant Formulation

The procedure adopted is that described in example 6a, but instead of the polymer A from example 3a, the identical amount of polymer B from example 3b is used.

Here again, a cartridge is filled and is stored at 20° C. for 24 h prior to analysis.

Example 6c: Production of a 1K Sealant Formulation

The procedure adopted is that described in example 6a, but instead of the polymer A from example 3a, the identical amount of polymer C from example 3c is used.

Here again, a cartridge is filled and is stored at 20° C. for 24 h prior to analysis.

Example 6d: Production of a 1K Sealant Formulation

The procedure adopted is that described in example 6a, but instead of the polymer A from example 3a, the identical amount of polymer D from example 3d is used.

Here again, a cartridge is filled and is stored at 20° C. for 24 h prior to analysis.

Example 6e (Not Inventive): Production of a 1K Sealant Formulation

The procedure adopted is that described in example 6a, but instead of the polymer A from example 3a, the identical amount of polymer E from example 3e is used.

Here again, a cartridge is filled and is stored at 20° C. for 24 h prior to analysis.

Example 6f (Not Inventive): Production of a 1K Sealant Formulation

The procedure adopted is that described in example 6a, but instead of 30.0 g of polymer A from example 3a, 12.0 g of polymer F from example 3f and 18 g of a silane-terminated polypropylene glycol having an average molar mass ($M_n$) of 18,000 g/mol and end groups of the formula —O—C(=O)—NH—$(CH_2)_3$—$Si(OCH_3)_3$ (available commercially under the name GENIOSIL® STP-E35 from Wacker Chemie A G, Munich, DE) are used.

Here again, a cartridge is filled and is stored at 20° C. for 24 h prior to analysis.

Example 7: Determination of Properties Profiles of the Sealants Produced

The sealants obtained in examples 6a to 6f, if they had not already cured in the cartridge, were allowed to crosslink and were investigated for their skin formation and their mechanical properties. The results are found in table 2.

Skin-forming time, Shore A hardness, tensile strength and 100% modulus are determined as described in example 5.

The resilience is measured in accordance with DIN EN ISO 7389, storage according to method B.

For low-modulus sealants, the resilience ought preferably to be more than 70%.

TABLE 2

| | Example | | | | | |
| --- | --- | --- | --- | --- | --- | --- |
| | 6a | 6b | 6c | 6d | 6e* | 6f* |
| | | inventive | | | not inventive | |
| Ratio α:γ | 30:70 | 35:70 | 40:60 | 50:50 | 70:30 | ** |
| SFT 1 day storage [min] | 39 | 29 | 21 | 5 | solid*** | solid*** |
| Hardness [Shore A] | 28 | 24 | 20 | 22 | | |
| 100% modulus [N/mm] | 0.45 | 0.43 | 0.31 | 0.40 | | |
| Tensile strength [N/mm] | 1.4 | 1.2 | 1.0 | 1.2 | | |

TABLE 2-continued

| | Example | | | | | |
| --- | --- | --- | --- | --- | --- | --- |
| | 6a | 6b | 6c | 6d | 6e* | 6f* |
| | | inventive | | | not inventive | |
| Elongation at break [%] | 900 | 923 | 811 | 650 | | |
| Resilience [%] | 84 | 79 | 72 | 60 | | |

*not inventive
**mixture of 40% of polymer F with 100% α-silane termination and 60% of a polymer with 100% γ-silane termination
***fully cured while still in cartridge.

The invention claimed is:

1. A crosslinkable composition (Z), comprising:

(A) 100 parts by weight of compound(s) of the formula $$Y—[(CR^1_2)_a—Si(OR)_3]_x \qquad (I),$$

where

Y is an x-valent polymer radical bonded via nitrogen or oxygen,

R each is identical or different and is hydrogen or a monovalent, optionally substituted hydrocarbon radical, $R^1$ each is identical or different and is hydrogen or a monovalent, optionally substituted hydrocarbon radical which may be attached via nitrogen, phosphorus, oxygen, sulfur or carbonyl group to the carbon atom, x is an integer from 2 to 10 and a is an integer from 1 to 10, with the proviso that in component (A) in 5% to 60% of all the units $[(CR^1_2)_a—Si(OR)_3]$ a is 1 and in at least 5% of all the compounds of the formula (I) per molecule at least one a is 1 and at least one a is an integer from 2 to 10, (B) at least 0.1 part by weight of tetraethoxysilane and/or silanes of the formula $$R^4—Si(CH_3)_b(OR^2)_{3-b} \qquad (II),$$

where $R^2$ each is identical or different and is hydrogen or a monovalent, optionally substituted hydrocarbon radical, $R^4$ is a monovalent, optionally substituted hydrocarbon radical optionally interrupted by oxygen atoms and which contains no nitrogen atom not bonded directly to a carbonyl group, and no heteroatom separated only by a single carbon atom from the silicon atom, and b is 0 or 1, and also (C) optionally at most 2 parts by weight of one or more silanes of the formula $$X—CH_2—SiR^6_c(OR^5)_{3-c} \qquad (III),$$

where $R^5$ each is identical or different and is hydrogen or a monovalent, optionally substituted hydrocarbon radical, $R^6$ each is identical or different and is a monovalent, optionally substituted hydrocarbon radical, X is a group of the formula —$NR^7_2$, —$NR^7$—CO—$R^8$, —$NR^7$—CO—$OR^8$, —$NR^7$—CO—$NR^8_2$, —$OR^7$, —O—CO—$R^7$, O—CO—$OR^7$, O—CO—$NR^7_2$ or a heterocycle bonded via N atom, $R^7$ each is identical or different and is hydrogen or a monovalent, optionally substituted hydrocarbon radical having 1 to 6 carbon atoms, $R^8$ each is identical or different and is hydrogen or a monovalent, optionally substituted hydrocarbon radical having 1 to 6 carbon atoms and c is 0 or 1.

2. The crosslinkable composition of claim 1, wherein the value of a in at least 10% to 45% of all the units $[(CR^1_2)_a$—$Si(OR)_3]$ in component (A) is 1.

3. The crosslinkable composition of claim 1, wherein at least 15% of all the compounds of the formula (I) possess per molecule at least one group $[(CR^1_2)$—$Si(OR)_3]$ and at least one group $[(CR^1_2)_a$—$Si(OR)_3]$ in which a is an integer from 2 to 10.

4. The crosslinkable composition of claim 2, wherein at least 15% of all the compounds of the formula (I) possess per molecule at least one group $[(CR^1_2)$—$Si(OR)_3]$ and at least one group $[(CR^1_2)_a$—$Si(OR)_3]$ in which a is an integer from 2 to 10.

5. The crosslinkable composition of claim 1, wherein at least 15% of all the compounds of the formula (I) possess per molecule at least one group $[(CR^1_2)$—$Si(OR)_3]$ and at least one group $[(CR^1_2)_3$—$Si(OR)_3]$.

6. The crosslinkable composition of claim 1, wherein the compounds (A) are polyalkylene glycols which have end groups with propylene spacers of the formulae —O—C(=O)—NH—$(CH_2)_3$—$Si(OC_2H_5)_3$ or —O—C(=O)—NH—$(CH_2)_3$—$Si(OCH_3)_3$ in combination with end groups with methylene spacers of the formulae —O—C(=O)—NH—$CH_2$—$Si(OCH_3)_3$ or —O—C(=O)—NH—$CH_2$—$Si(OC_2H_5)_3$.

7. A method for producing a composition (Z) of claim 1, comprising mixing the individual components in any desired order.

8. A shaped article produced by crosslinking a composition (Z) of claim 1.

9. A shaped article produced by crosslinking a composition (Z) produced by the process of claim 7.

10. The shaped article of claim 8, wherein the article has an elongation at break of at least 200% and a resilience of at least 70%.

11. A method for adhesively bonding substrates, comprising: applying an adhesive comprising the composition (Z) of claim 1 to a surface of at least one substrate, contacting the surface of the at least one substrate with a second substrate, and crosslinking the adhesive.

12. A method for producing an assembly of materials, comprising applying the composition (Z) of claim 1 to at least one substrate and subsequently crosslinking the composition (Z).

* * * * *